Nov. 3, 1936.  L. F. CARTER  2,059,313
ANTIVIBRATION MOUNTING FOR INSTRUMENTS
Filed Sept. 11, 1934
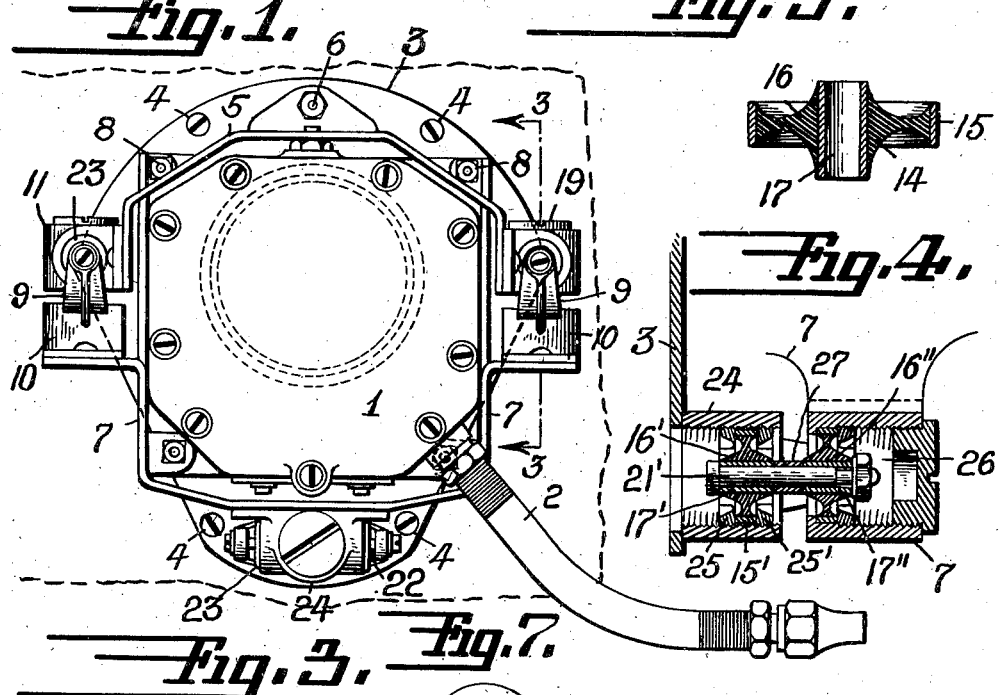
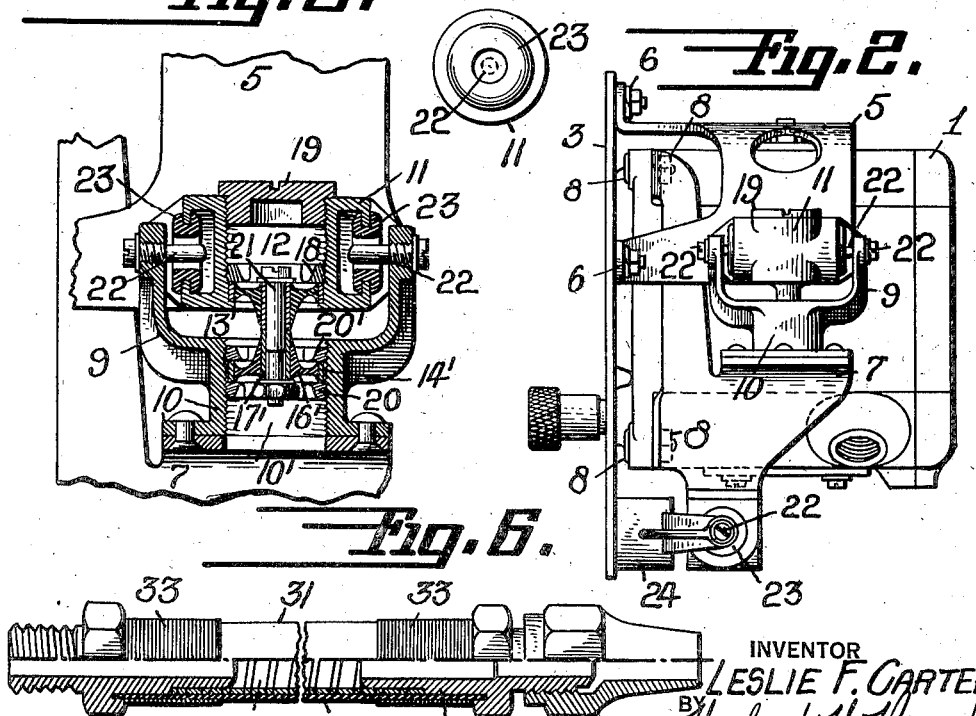
INVENTOR
*LESLIE F. CARTER*
BY
*Herbert H. Thompson*
HIS ATTORNEY.

Patented Nov. 3, 1936

2,059,313

UNITED STATES PATENT OFFICE 2,059,313

ANTIVIBRATION MOUNTING FOR INSTRUMENTS

Leslie F. Carter, Leonia, N. J., assignor to Sperry Gyroscope Company, Inc., Brooklyn, N. Y., a corporation of New York Application September 11, 1934, Serial No. 743,514

3 Claims. (Cl. 248—358)

This invention relates to an anti-vibration mounting for aircraft instruments. Many aircraft instruments are quite delicate and the engine vibrations in the average aircraft are sufficient to greatly reduce the useful life of the delicate instruments unless special means are employed to absorb the vibrations before they reach the instruments. My invention is shown as applied to the mounting of a gyroscopic indicator on aircraft, but it is obvious that it may be applied to any small instrument.

Referring to the drawing showing a preferred form of the invention,

Fig. 1 is a rear view of a gyroscopic instrument as mounted on the rear of the aircraft instrument panel.

Fig. 2 is a side view of the same.

Fig. 3 is a vertical section, on an enlarged scale, through one of the shock absorbing mountings which furnish a two-point suspension of the instrument, taken on line 3—3 of Fig. 1.

Fig. 4 is a similar sectional view through the mounting which absorbs the transverse shocks and furnishes the third point of my three-point suspension.

Fig. 5 is a detail of one of the rubber discs employed.

Fig. 6 is an elevation, partly in section, of the special form of tubing for the air supply, which is also made vibration absorbing.

Fig. 7 is a detail of one of the rubber snubbers.

The instrument to be mounted on the aircraft instrument panel is shown as enclosed within a casing 1. In this instance the instrument is a gyroscopic indicator, such as an artificial horizon or directional gyroscope, the casing being made air-tight and air being withdrawn through flexible tube 2. Heretofore the casing 1 has been bolted to the instrument panel (shown in dotted lines in Fig. 1), but I prefer to interpose my special anti-vibration mounting. This consists of a plate 3 which may be bolted to the instrument panel by bolts 4. To said plate is secured a U-shaped bracket 5, said bracket being bolted to said plate at three points 6. A second U-shaped bracket 7 is secured to the instrument casing as by bolts 8. Said bracket is suspended from the first named bracket 5 at two spaced points on opposite sides of the instrument and preferably in substantially the same horizontal plane as the center of gravity of the instrument. As shown, a small U-shaped bracket 9 is secured to each side of the bracket 7. The base 10 of said bracket is made hollow and is threaded as at 10'.

There is also secured to the bracket 5 a complementary hollow block 11 which is interiorly threaded at 12. Preferably the threads terminate above the bottom of said block 11, providing a shoulder 13. In said aperture is placed a small wheel or disc-like member 14 (see Fig. 5) consisting of a metal rim 15, an annular rubber web or diaphragm 16 and a hub or thimble 17, the thimble being of greater length than the rim and the web being in intimate contact with both 15 and 17 throughout their length. The rim 15 is placed on said shoulder 13 and locked down by hollow nut 18. The aperture may then be closed by nut 19. Within the aperture 10' in bracket 9 is also mounted a similar disc 14' clamped between upper and lower nuts 20 and 20'. A tension bolt 21 extends through both sleeves 17 and 17' and tightly clamps the same together. Under the weight of the instrument the rubber discs 16, 16' will deform as shown in Fig. 3, and the weight of the instrument will be supported by flexible rubber in all directions, the bolt 21 acting as the single metallic tension member. The center of gravity of the support with respect to the instrument may be readily varied by screwing in or out the nuts 20 and 20'.

In order to prevent jouncing of the instrument and severe shocks from breaking or damaging the rubber discs, I have shown shock absorbing pins 22 extending inwardly from the U-shaped bracket 9. Surrounding each of said pins but spaced therefrom is a rubber disc 23 held in the upper bracket 11, so that in case the shock is severe the pins will strike the rubber discs and absorb the shock.

I also provide at the bottom of the bracket 7 a single shock absorbing connection for absorbing transverse shocks and also providing for accurate adjustment of the tilt or level of the instrument on the panel. Referring to Fig. 4, the plate 3 is shown as having a short threaded sleeve 24 projecting therefrom, in which are threaded two nuts 25, 25' similar in structure and function to the nuts 20 and 20', and between which is clamped the ring 15' of the shock absorbing disc 16'. Likewise there is provided a threaded aperture 26 in the bottom of bracket 7, in which is clamped a second rubber disc 16''. In this case an extra sleeve 27 is placed between the thimbles 17' and 17'' and the three compression sleeves are held together by tension bolt 21'. It will readily be seen that the inclination of the instrument may then change with respect to the panel by screwing in and out the nuts 25, 25'.

In order to prevent vibration from reaching the instrument through the air hose, said hose is likewise made flexible, as shown in Fig. 6. Said hose is shown as composed of an interior spirally wound interlocking metal strip 30, which is compressible longitudinally. To make said tubing air-tight, I place over the same a soft, flexible rubber sleeve 31. Since said instruments operate below atmospheric pressure by exhausting the air through the tube, the atmospheric pressure keeps the rubber sleeve tight against the spiral metal 30 and maintains the device air-tight although extremely flexible in all directions. Both the spiral metal strip and the rubber sleeve are clamped at their ends against metallic end pieces 32, the same being held in place by tightly wound threads 33.

By my invention the vibrations of the instrument panel, amounting to as much as .025 to .030 (25 to 30/1000) of an inch at frequencies above 300 cycles per minute, are reduced to not more than .004 (4/1000) of an inch vibration in any plane, and the life of the aircraft instrument is increased and the performance bettered.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An anti-vibration mounting for instruments on a panel, comprising a pair of spaced fixtures for supporting the weight of the instrument at two spaced points substantially in the horizontal and vertical planes containing the center of gravity of the instrument, and a third fixture at the bottom thereof for coupling it to the panel transversely, each of said fixtures including a rubber diaphragm on both the supported and supporting members, connected at their centers by a tension bolt.

2. An anti-vibration fixture for instrument mounting comprising an upper member adapted to be secured to a fixed part and a lower member adapted to be secured to the instrument, each member having a rubber diaphragm secured at its periphery to the adjacent member, the central hole in said diaphragm having an elongated sleeve secured thereto, and a tension member extending through said sleeves, one of said members having rubber rings, the axes of which are at right angles to the axes of said diaphragms, and the other stop pins adapted to extend within said rings without touching the same, normally.

3. An anti-vibration mounting for instruments on a panel, comprising a pair of spaced fixtures for supporting the weight of the instrument at two spaced points substantially in the horizontal and vertical planes containing the center of gravity of the instrument, a third fixture at the bottom thereof for coupling it to the panel transversely, each of said fixtures including a rubber diaphragm on both the supported and supporting members, connected at their centers by a tension bolt, rubber rings on one part of the fixture and spaced, concentric pins on the other part of smaller diameter than the holes in said rings so as to strike said rings only upon excessive vibration for absorbing severe shocks.

LESLIE F. CARTER.